(12) United States Patent
Körfer

(10) Patent No.: US 7,848,503 B2
(45) Date of Patent: Dec. 7, 2010

(54) METHOD FOR PROCESSING AN UNTAKEN CALL ON A CALLED COMMUNICATION TERMINAL

(75) Inventor: Hans Körfer, Aachen (DE)

(73) Assignee: Cycos Aktiengesellschaft, Alsdorf (DE)

( * ) Notice: Subject to any disclaimer, the term of this patent is extended or adjusted under 35 U.S.C. 154(b) by 1144 days.

(21) Appl. No.: 11/494,013

(22) Filed: Jul. 27, 2006

(65) Prior Publication Data
US 2008/0043966 A1 Feb. 21, 2008

(51) Int. Cl.
*H04M 3/42* (2006.01)
(52) U.S. Cl. .............................. 379/202.01; 379/210.01
(58) Field of Classification Search .............. 455/412.2, 455/418, 552; 379/210.01, 211.02, 202.01
See application file for complete search history.

(56) References Cited

U.S. PATENT DOCUMENTS

| | | | | |
|---|---|---|---|---|
| 7,266,190 | B1 * | 9/2007 | Mullis et al. | 379/211.02 |
| 2002/0132635 | A1 * | 9/2002 | Girard et al. | 455/552 |
| 2005/0020247 | A1 * | 1/2005 | Lakkala | 455/412.2 |
| 2007/0015497 | A1 * | 1/2007 | Patel et al. | 455/418 |

* cited by examiner

*Primary Examiner*—Ahmad F Matar
*Assistant Examiner*—Sonia Gay

(57) ABSTRACT

The invention relates to a method for processing an untaken call on a called communication terminal, where at least for the untaken call a communication address for a caller or his calling communication terminal is entered in a caller list associated with the called communication terminal. An instruction given by the caller during or after the call suppresses a return call which can be initiated by the entry in the caller list.

14 Claims, 1 Drawing Sheet

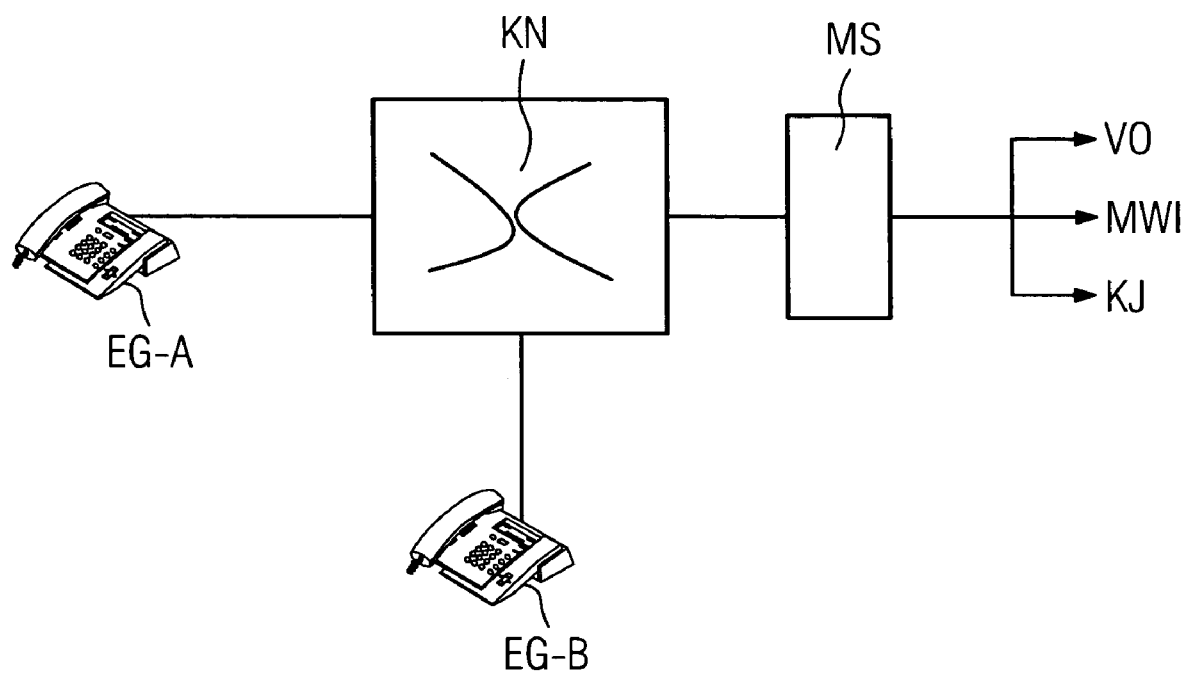

METHOD FOR PROCESSING AN UNTAKEN CALL ON A CALLED COMMUNICATION TERMINAL

FIELD OF THE INVENTION

The invention relates to a method for processing an untaken call on a called communication.

BACKGROUND OF THE INVENTION

Modern communication terminals are regularly equipped with display apparatuses (displays, monitors) for implementing convenience functions going beyond the pure communication function. Examples of such convenient communication terminals are telephones, fax machines, mobile telephones, cordless telephones, computers with a telephony function (known as "soft clients"), mobile computers (PDAs=Personal Digital Assistant), video conference devices or the like. A common feature of all of these appliances is that the display apparatus or another output apparatus (e.g. voice output) presents the user with a large amount of information relating to the current, an earlier or a subsequent call.

One of the most frequently used functions on modern communication terminals is what is known as the "caller list". In this context, the caller list is a type of "log book" about calls which have been made. In many communication terminals, a distinction is drawn here between outgoing calls, incoming calls, untaken, incoming calls ("missed" calls) etc.

The aforementioned untaken calls are recorded in cases in which a call was not taken while a user was absent or when a call has been received while the communication terminal was "busy", that is to say that the user could not or did not want to take the call on account of there being another call, for example. What is known as the "CLIP" (Calling Line Identification Presentation) function means that a communication address (usually the telephone number) for the communication terminal of the calling party is transmitted for most calls. This "Clip" information is entered into the caller list, usually with additional information such as the (last) call time and a number stating how often the caller vainly wished to set up a connection. On account of the telephone number recorded in the caller list, it is a very simple matter on most communication terminals to call back this caller simply by pressing a key or using a similar operating procedure. In many cases, this functionality saves the caller from leaving a message on a telephone answering machine (voice box, or the like) or repeatedly attempting at regular intervals of time to contact the user of the called communication terminal.

When using the known caller lists, it has been found to be disadvantageous that the called person frequently calls back the caller when he has returned or when the current telephone call has been terminated, even in cases in which the caller does not actually want this or the return call is pointless. By way of example, the reason for the original call may have since become obsolete, the caller himself can now no longer be contacted, or the return call is unwanted or unnecessary for other reasons. Such negative experiences mean that many people no longer use the caller list or its associated return call option, even though this convenience function is advantageous in may other instances for the aforementioned reasons.

SUMMARY OF THE INVENTION

It is therefore an object of the present invention to prevent the return call initiated on account of entries in a caller list at least in cases in which the original caller does not want this return call.

The object is achieved by a method in accordance with the independent claims.

In this context, the way of achieving the object provides a method for processing an untaken call on a called communication terminal, where at least for the untaken call a communication address for a caller or his calling communication terminal is entered in a caller list associated with the called communication terminal. In this case, an instruction given by the caller during or after the call suppresses a return call which can be initiated by the entry in the caller list. By processing a special instruction from the caller it is therefore possible to distinguish between untaken calls which require or would like a return call and those untaken calls for which the caller does not want a return call.

Advantageous refinements of the inventive method are specified in the dependent patent claims.

The instruction given is processed easily when the instruction from the caller deletes the caller's, or his communication terminal's, communication address entered in the caller list from the caller list.

In cases in which the information about the untaken call must not be lost and hence must not be deleted, it is alternatively possible for the instruction from the caller to provide his call's associated entry in the caller list with a flag, the flag being able to show that there is no need for a return call. Advantageously, a flag of this kind can cause the relevant entry in the caller list to be shown by a special symbol or by appropriate text information.

If a return call to the originally calling communication terminal is initiated despite this flag for the entry in the caller list then an output with an indication that there is no need for the return call can be made on the communication terminal before the call is returned. This allows the subscriber returning the call to abort the initiated return call before the original caller is called and before connection costs can arise.

A convenient operating option is obtained if the instruction is input by the caller by means of an input on his communication terminal during the call or after the untaken call has been terminated. In this context, the instruction can advantageously be given by inputting a key combination, by operating a menu function of a graphical user interface or by entering a verbal command on the calling communication terminal.

If a call log at least for outgoing calls is managed for the calling communication terminal then the instruction can also be given by editing or deleting the appropriate entry in this call log. A convenient option of this kind is advantageous in the case of what are known as "CTI" arrangements, for example, where a user manages his communication contacts and calls using a personal computer or a similar appliance.

An exemplary embodiment of the inventive method is explained below with reference to the drawing. This exemplary embodiment is also used at the same time to explain communication terminals and network components which are suitable for carrying out the method.

BRIEF DESCRIPTION OF THE DRAWING

The sole FIGURE schematically shows an arrangement comprising two communication terminals, a communication node and a communication server.

DETAILED DESCRIPTION OF THE INVENTION

The FIGURE shows a schematic illustration of an arrangement comprising two communication terminals EG-A, EG-B, a communication node KN and a communication server MS. In this exemplary embodiment, the communication terminals EG-A, EG-B are what are known as "added-feature telephones", that is to say telephones having an alphanumeric display apparatus and convenience functions. They are connected to a private communication exchange as communication nodes KN. It goes without saying that instead of the circuit-switched telephones shown here it is also possible to use VOIP (Voice over Internet Protocol) telephones or any other communication terminals. The communication node KN also has a Unified Messaging Server connected to it as communication server MS.

The communication terminals EG-A, EG-B are respectively equipped with the functionality for a caller list. Similarly, the communication node KN has been preset such that for every call to the communication terminals EG-A, EG-B the communication address transmitted is the telephone number of the respected caller or of his communication terminal EG-A, EG-B, provided that one of the users of the communication terminals EG-A, EG-B has not preset that transmission of his telephone number is suppressed. As an alternative to the arrangement described here, the caller lists for the communication terminals EG-A, EG-B may also be stored in a memory area of the communication node KN or in another device in the communication network or an associated data network; in these cases too, the caller list can be retrieved via the display apparatuses (displays) on the connected communication terminals EG-A, EG-B.

The communication server MS is what is known as a "Unified Messaging System". This device provides various services, such as voicemail service, fax server service, e-mail system or the like, on a common hardware platform. Every user is able to access his associated data, lists etc. on the communication server MS using his communication terminal EG-A, EG-B (telephone interface), but alternatively convenient access is possible using PCs, which are usually available to the users of the communication terminals EG-A, EG-B at their workstations.

The communication server MS is equipped with various user interfaces VO, MWI, KJ. The user interface VO (Voicebox Outcall) informs the respective user by automatic call on his communication terminal EG-A, EG-B about stored or recently recorded voice messages (voicemails), and the user interface KJ is used to display the communication logs, described in detail later. The user interface MWI (Message Waiting Indication) controls a "letterbox lamp" on the respective user's communication terminal EG-A, EG-B, that is to say a display apparatus which indicates available messages or untaken calls.

The communication server MS is equipped with what is known as a "CTI" (Computer Telephony Integration) function, each user being able to set up a call ("select from an address list") for his associated communication terminal EG-A, EG-B and access his communication logs using his PC. The communication logs essentially comprise lists which log incoming, outgoing, untaken and other calls. In this context, the users are able to select any communication addresses (telephone numbers) stored in these lists by means of "mouse clicks" or using another operating procedure and thus to set up a call. The same applies to similar lists managed in the communication terminals EG-A, EG-B or for the communication terminals EG-A, EG-B at the communication node KN; simple operating procedures can also be used to set up a new call from these lists, logs or the like (e.g. caller lists).

The present exemplary embodiment relates to calls in the sense of telephone calls. Nevertheless, the method steps and devices shown here can also be transferred to other communication forms, for example video conference connections, chat connections, mobile connections etc.

It is subsequently assumed that none of the communication terminals EG-A, EG-B has been preset to suppress the transmission of the telephone number for outgoing calls ("transmission of the CLIP information"). The user of the communication terminal EG-A dials the telephone number of the communication terminal EG-B, so that the communication node KN signals a call on the communication terminal EG-B. That is to say that the communication terminal EG-B "rings" and the telephone number of the communication terminal EG-A is shown on the display apparatus (display) of the communication terminal EG-B. However, the call is not taken, for example because the user of the communication terminal EG-B is temporarily absent or for other reasons. The user of the communication terminal EG-A terminates the call ("hangs up") and wants to prevent the user of the communication terminal EG-B calling him back on the basis of the entry which has just been produced in the caller list on the communication terminal EG-B or its associated caller list in the communication server MS. One reason for this might be that the user of the terminal EG-A will shortly leave his office, which means that any return call would go unanswered, or that the caller has "misdialled".

The user therefore calls up a menu function on his communication terminal EG-A, that is to say a command called "retrospective anonymization of last call". It goes without saying that this menu item may also have another name; alternatively, it is also possible to input a code number (for example "*#99#"). The command can be input during the call or else afterwards. Another option for inputting the command involves editing the call log of the calling communication terminal EG-A or a call log for outgoing calls which is associated with this communication terminal EG-A at the commication node KN or in the communication server MS. This calls log lists at least the dialled telephone numbers or the communication addresses used for outgoing calls. A simple operating procedure, for example clicking on or marking an entry and then operating a "Delete" function, allows the command to be given.

The call to the menu function is registered by the communication node KN (alternatively by the communication terminal EG-A or the communication server MS), with a log file there being searched for the information about what subscriber (communication terminal) the communication terminal EG-A last set up a call to. As already described, this was the communication terminal EG-B. The communication node KN now sends a control message to the communication terminal EG-B, and this deletes the last entry, namely the untaken call from the communication terminal EG-A or the telephone number of the communication terminal EG-A, in the caller list managed there. Similarly, the communication node KN sends a further control message to the communication server MS. This control message comprises the information (that is to say a command) that a log entry is to be deleted. The parameters of this command are the communication addresses (telephone numbers) of the calling communication terminal EG-A and of the called communication terminal EG-B. If, as outlined in one of the alternatives, the command is not input on the communication terminal EG-A, the relevant appliance/entity carries out appropriate command processing.

In the present example, the user of the communication terminal EG-B has chosen his associated user settings in the communication server MS such that already existing log entries cannot be deleted "externally", but when a command of this kind arrives the relevant log entry is allocated a flag which states that a return call on the basis of this log entry is not wanted. A "letterbox lamp" ("message waiting indication") activated in the course of the untaken call is reset provided that no other message or no other entry needs to continue to be displayed. On account of the control messages, the entry stored in the communication terminal EG-B is thus deleted from the caller list and the entry associated with the same event in the Unified Messaging System's log associated with this communication terminal EG-B is identified in a special way. This prevents the unwanted return call from the user of the communication terminal EG-B to the original caller.

If the user nevertheless initiates a return call by clicking on the identified telephone number of the caller, the communication server MS or the communication terminal EG-B can output an appropriate advice message before or during execution of the "dial" command, so that the person returning the call can abort his intention if appropriate before a call or a connection is set up. This saves time and costs.

I claim:

1. A method for processing an untaken call comprising:
    providing a first communication terminal, a communication node and a communication server, the first communication terminal connected to the communication node, the communication server connected to at least one of the first communication terminal and the communication node;
    at least one of the first terminal, the communication node and the communication server entering a log entry for a caller list associated with the first communication terminal comprising a communication address for a caller communication terminal of an untaken call;
    the caller communication terminal providing input to suppress a return call by the first communication terminal to the caller communication terminal;
    at least one of the communication node, communication server and first communication terminal receiving the input to suppress the return call;
    the communication server receiving input from the first communication terminal preventing deletion of log entries on the caller list if deletion commands are not communicated by the first communication terminal;
    the communication server receiving a command to delete the log entry of the caller list for the caller communication terminal via the input to suppress a return call from the caller communication terminal; and
    the communication server not deleting the log entry and instead flagging the log entry.

2. The method as claimed in claim 1, wherein the first communication terminal is a telephone or an added feature telephone and the caller communication terminal is a telephone or an added feature telephone.

3. The method as claimed in claim 1, wherein the flagging is comprised of providing a flag in the caller list associated with the log entry, the flag indicating that there is no need for a return call.

4. The method as claimed in claim 3, wherein if a return call to the caller communication terminal is initiated via the first communication terminal despite the flag, then an output with an indication that there is no need for the return call is made on the first communication terminal.

5. The method as claimed in claim 1, wherein the providing of input to suppress a return call is comprised of the caller communication terminal providing an instruction to the first communication terminal or the communication server.

6. The method as claimed in claim 5, wherein the instruction is provided by one of the group consisting of: a key combination, operating a menu function, and by entering a verbal command on the caller communication terminal.

7. The method as claimed in claim 5, wherein if a call log for outgoing calls is managed for the caller communication terminal, then the instruction is given by editing or deleting an appropriate entry in the outgoing call log.

8. A method for processing an untaken call comprising:
    providing a first communication terminal, a communication node and a communication server, the first communication terminal connected to the communication node, the communication server connected to at least one of the first communication terminal and the communication node;
    at least one of the first terminal, the communication node and the communication server entering a log entry for a caller list associated with the first communication terminal comprising a communication address for a caller communication terminal of an untaken call;
    the caller communication terminal providing input to suppress a return call by the first communication terminal to the caller communication terminal;
    at least one of the communication node, communication server and first communication terminal receiving the input to suppress the return call;
    at least one of the first communication terminal and the communication server receiving a command to delete the log entry of the caller list for the caller communication terminal via the input to suppress a return call from the caller communication terminal; and
    at least one of the first communication terminal and the communication server deleting the log entry; and
    wherein if a call log for outgoing calls is managed for the caller communication terminal, then the command to delete a log entry of the caller list for the caller communication terminal via the input to suppress a return call from the caller communication terminal is initiated by deleting an outgoing call entry to the first communication terminal identified in the call log for outgoing calls for the caller communication terminal.

9. The method as claimed in claim 8, wherein the first communication terminal is a telephone or an added feature telephone and the caller communication terminal is a telephone or an added feature telephone.

10. The method of claim 8 wherein the input to suppress a return call from the caller communication terminal is a message transmitted via the caller communication terminal that is comprised of a code number or code input during the untaken call or afterwards.

11. The method of claim 1 wherein if a call log for outgoing calls is managed for the caller communication terminal, then the command to delete a log entry of the caller list for the caller communication terminal via the input to suppress a return call from the caller communication terminal is initiated by deleting an outgoing call entry to the first communication terminal identified in the call log for outgoing calls for the caller communication terminal.

12. The method of claim 1 wherein the caller communication terminal providing the input to suppress a return call by the first communication terminal to the caller communication terminal before the untaken call is completed.

13. The method of claim 8 wherein the caller communication terminal providing the input to suppress a return call by the first communication terminal to the caller communication terminal before the untaken call is completed.

14. A method for processing an untaken call comprising:
    providing a first communication terminal, a communication node and a communication server, the first communication terminal connected to the communication node, the communication server connected to at least one of the first communication terminal and the communication node;

at least one of the first terminal, the communication node and the communication server entering a log entry for a caller list associated with the first communication terminal comprising a communication address for a caller communication terminal of an untaken call;

the caller communication terminal providing input to suppress a return call by the first communication terminal to the caller communication terminal before the caller communication terminal completes the untaken call;

at least one of the communication node, communication server and first communication terminal receiving the input to suppress the return call;

at least one of the first communication terminal and the communication server receiving a command to delete the log entry of the caller list for the caller communication terminal via the input to suppress a return call from the caller communication terminal; and at least one of the first communication terminal and the communication server deleting the log entry.

\* \* \* \* \*